A. H. EISEMAN.
TRACE HOLDER.
No. 10,870. Reissued Oct. 4, 1887.
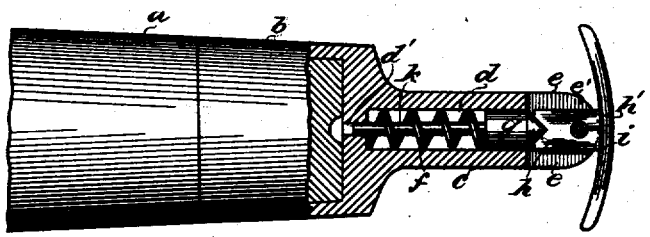
Attest:
Emma Arthur
Inventor:
Augustus H. Eiseman
By Knight Bros.
Attys.
N. PETERS, Photo-Lithographer, Washington, D. C.

UNITED STATES PATENT OFFICE.

AUGUSTUS H. EISEMAN, OF ST. LOUIS, MISSOURI.

TRACE-HOLDER.

SPECIFICATION forming part of Reissued Letters Patent No. 10,870, dated October 4, 1887.

Original No. 355,600, dated January 4, 1887. Application for reissue filed April 22, 1887. Serial No. 235,811.

*To all whom it may concern:*

Be it known that I, AUGUSTUS H. EISEMAN, a citizen of the United States, residing in the city of St. Louis, State of Missouri, have invented certain new and useful Improvements in Trace Holders and Fasteners, of which the following is a full, clear, and exact description, reference being had to the accompanying drawings, forming part of the same.

My invention relates to improvements in the holders or fasteners attached to the ends of singletrees of carriages, wagons, train-cars, and other vehicles for securing thereon the traces of horses, and has for its object a simple and rapid means of hitching the traces onto the singletrees and for releasing them therefrom in event of the horses falling, or in other emergency.

The drawing shows a part of a singletree, part in side elevation and part in section, with my invention applied thereto.

In the drawing, *a* represents the end portion of a singletree, at the end of which is secured the cap or ferrule *b*, which is narrowed, forming the projecting neck or stem *c*, having the hollow bore or cavity *d*. The outer end of the stem *c* is slotted transversely, as seen at *e*. Within the cavity or bore *d* is a spiral spring, *f*, which bears against the inner end of the cavity and against the locking piece or bolt *g*, the outer end of which bolt is conical or wedge shaped, and engages in a conical or V-shaped cavity or recess, *h*, in the shank *h'* of the button *i*, which shank is pivoted between the jaws or ears *e'*, formed upon the stem by the slots *e e*. A guiding rod or stem, *k*, may project from the inner end of the bolt *g* through an aperture at *d'* at the inner end of the cavity *d*.

The button *i* is shown in its normal position, and when it is turned in either direction from this position it forces the lock piece or bolt *g* inward, which meets the resistance of the spring *f*, which presses against the bolt *g*, tending to retain the conical or wedge-shaped end of the bolt in the cavity or recess *h* of the shank *h'* of the button. Owing to the resistance of the bolt and the spring, the button is held in its normal position until sufficient pressure is exerted in turning the button to throw the bolt *g* backward out of the cavity *h*. When the head of the button is swung around in line with the stem *c*, the trace may easily engage upon or disengage from the stem, and then snapped back into its normal position.

It will be observed that according to my invention the button *i* is situated entirely beyond the extremity of the stem *c*, which forms a continuation of the whiffletree. This is an important feature of my invention, as it not only enables the button to be made of any desired size without proportionately altering the size of the other parts, but it also enables the reduction of the depth of the slot *e* to a minimum.

I am aware that it has been proposed to place upon the end of a whiffletree a hollow stem slotted longitudinally at its extremity, so as to form parallel ears between which a turn-button of elliptical shape is situated and pivoted, so as to be capable of being placed with its greatest diameter either parallel with or at right angles to the axis of the stem, a spring-actuated stem being situated within the hollow stem and provided with a T-head having a concave surface for engaging the side of the turn-button for holding it in either position which it is capable of assuming. Such I do not claim; nor is it the equivalent of my invention.

I claim as my invention—

1. The combination, with the whiffletree, of a hollow stem secured thereto, a button situated beyond the extremity of said stem and having a shank by which it is pivotally connected thereto, and a spring within the stem for holding said button across the end of the stem, substantially as set forth.

2. The combination, with the whiffletree, of the hollow stem slotted longitudinally at its extremity for forming parallel ears, a button situated beyond the extremity of the stem and having a shank projecting into the slot between said ears, a pivot-pin upon which said shank turns, and a spring-bolt situated within said hollow stem and bearing against said shank, substantially as and for the purpose set forth.

3. The combination, with the whiffletree, of the stem having the cavity and longitudinal slot forming parallel ears, the button situated entirely beyond the extremity of the stem and having the shank projecting into the slot between the ears to which it is pivoted, and the spring-actuated bolt situated within the said cavity and bearing against the shank of the button, the said cavity being of such size as to permit the entire bolt to recede within it, substantially as set forth.

4. The combination, with the whiffletree, of the stem having the cavity and the slot, forming ears, the button pivoted between said ears, the bolt situated within the said cavity and having the stem, and the spring surrounding the stem and bearing at one end against the end of the cavity and at the other upon the bolt for forcing it into contact with the button, substantially as and for the purpose set forth.

5. In a trace-holder, the combination of the shank *c*, slotted at *e*, and having a cavity, *d*, the sliding bolt *g*, having a conical face, the spring *f*, and the pivoted button *i*, having a conically-recessed shank, *h'*, substantially as and for the purpose specified.

AUGUSTUS H. EISEMAN.

In presence of—

SAML. KNIGHT,

BENJN. A. KNIGHT.